(12) United States Patent
Cope et al.

(10) Patent No.: US 8,908,681 B1
(45) Date of Patent: Dec. 9, 2014

(54) FACILITATING CALL CONTINUITY WHEN TRANSFERRING CALLS BETWEEN A MOBILE ACCESS NETWORK TO A VOIP NETWORK

(75) Inventors: Warren Bruce Cope, Olathe, KS (US); Manoj Monga, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/485,876

(22) Filed: May 31, 2012

(51) Int. Cl.
*H04L 12/66* (2006.01)
(52) U.S. Cl.
USPC .......................................................... 370/354
(58) Field of Classification Search
USPC .............. 370/352, 401, 354, 395.52; 709/227
See application file for complete search history.

(56) References Cited

U.S. PATENT DOCUMENTS 8,442,005 B2 * 5/2013 Dutta et al. .................. 370/331

\* cited by examiner

*Primary Examiner* — Chandrahas Patel

(57) ABSTRACT

Systems, methods, and computer-readable media for facilitating call continuity when transferring calls between mobile access networks to voice over internet protocol networks. The method includes recognizing availability of a voice over internet protocol network during a voice call established via a wireless access network. Thereafter, a data connection between a user device and the voice over internet protocol network is established. A transfer of the voice call from the wireless access network to the voice over internet protocol network is initiated by initiating a three-way call. Such a three-way call includes a first portion routed to a destination device via a public switch telephone network and a second portion routed to the user device via the voice over internet protocol network.

14 Claims, 10 Drawing Sheets

FACILITATING CALL CONTINUITY WHEN TRANSFERRING CALLS BETWEEN A MOBILE ACCESS NETWORK TO A VOIP NETWORK

BRIEF SUMMARY

A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter. In brief, and at a high level, this disclosure describes, among other things, facilitating call continuity when transferring calls between a mobile access network to a VoIP network. Utilizing embodiments hereof, a user device initially utilizing a mobile access network for voice communication can seamlessly transfer to a VoIP network, such as Wi-Fi, when such a network becomes available to the user device. In this way, assume a user is on a voice call initiated via a mobile access network. Further assume the user enters an area in which VoIP services can be provided. In accordance with embodiments described herein, voice continuity can be maintained as the voice call is transferred from the mobile access network to the VoIP network.

BRIEF DESCRIPTION OF THE DRAWINGS

Illustrative embodiments of the present invention are described in detail below with reference to the attached drawing figures, and wherein.

DETAILED DESCRIPTION

Figure 1:
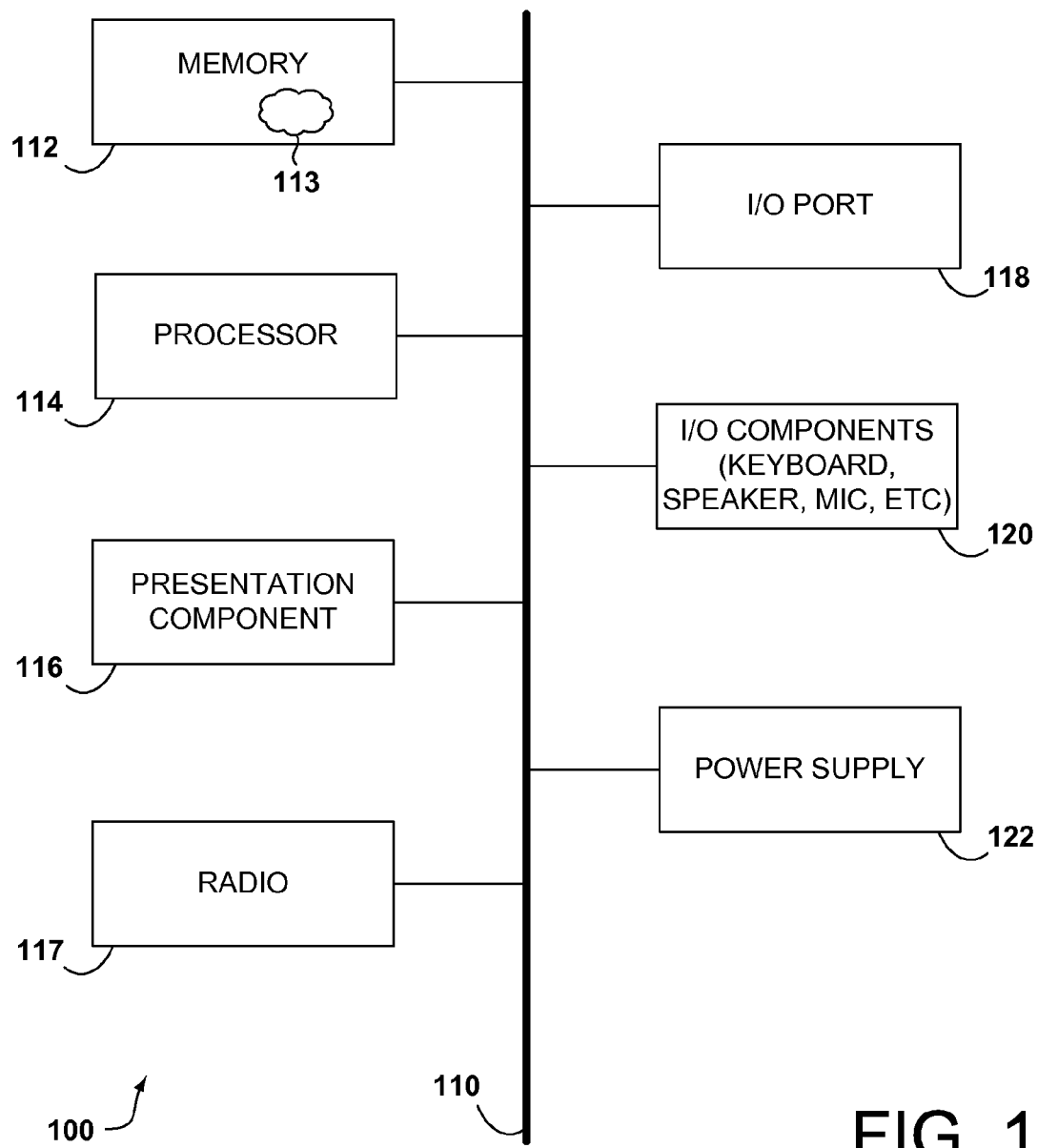
FIG. 1 depicts an exemplary computing device according to embodiments of the present invention.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Embodiments of the present invention provide systems, methods, and computer-readable media for facilitating call continuity when transferring calls between a mobile access network to a VoIP network. Utilizing embodiments hereof, a user device initially utilizing a mobile access network for voice communication can seamlessly transfer to a VoIP network, such as a Wi-Fi network, when such a network becomes available to the user device. In this way, assume a user is on a voice call initiated via a mobile access network. Further assume the user enters an area in which VoIP services can be provided. In accordance with embodiments described herein, voice continuity can be maintained as the voice call is transferred from the mobile access network to the VoIP network.

According, in one aspect, the present invention is directed to one or more computer-readable storage media having computer-executable instructions embodied thereon that, when executed, perform a method for facilitating call continuity when transferring calls between mobile access networks to voice over internet protocol networks. The method includes recognizing availability of a voice over internet protocol network during a voice call established via a wireless access network. A data connection between a user device and the voice over internet protocol network is established. A transfer of the voice call from the wireless access network to the voice over internet protocol network is initiated by initiating a three-way call, wherein the three-way call comprises a first portion routed to a destination device via a public switch telephone network and a second portion routed to the user device via the voice over internet protocol network.

In another aspect, embodiments of the present invention are directed to one or more computer-readable storage media having computer-executable instructions embodied thereon that, when executed, perform a method for facilitating call continuity when transferring calls between mobile access networks to voice over internet protocol networks. The method includes establishing a data connection between the user device and a voice over internet protocol network during a first voice call established between a user device and a destination device via a wireless access network. An action is automatically performed via the user device to initiate placing the first voice call on hold. A second voice call is initiated by communicating a conference indicator that provides an indication to initiate a three-way call using the voice over internet protocol network. A binding of a first portion of the first voice call and a first portion of the second voice call is initiated. A voice over internet protocol call is received via the voice over internet protocol network. A tear down of the bound first portion of the first voice call and first portion of the second voice call that exists from the user device to a mobile switching center is initiated. Accordingly, the destination device communicates via the voice over internet protocol network.

In yet another aspect, a system for call continuity when transferring calls between mobile access networks to voice over internet protocol networks. The system includes a user device that automatically initiates a three-way call upon the user device connecting with a Wi-Fi network when on an active call with a recipient device via a mobile access network. The system also includes a mobile switching center that recognizes a conference indicator received from the user device that indicates initiation of the three-way call. The system further includes a voice over internet protocol gateway that receives the conference indicator provided by the mobile switching center and, based on the conference indicator, creates a voice over internet protocol call to the user device via a voice over internet protocol network.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

3G Third Generation Mobile Telecommunications
4G Fourth Generation Mobile Telecommunications
BSC Base Station Controller
CD-ROM Compact Disk Read Only Memory
CDMA Code Division Multiple Access
GPRS General Packet Radio Service
GSM Global System for Mobile communications: originally from Groupe Spécial Mobile
DVD Digital Versatile Discs
EEPROM Electrically Erasable Programmable Read Only Memory
IP Internet Protocol
LTE Long Term Evolution
MSC Mobile Switching Center
PC Personal Computer
PDA Personal Digital Assistant
PSTN Public Switched Telephone Network
RAM Random Access Memory
ROM Read Only Memory
TDMA Time Division Multiple Access
UMTS Universal Mobile Telecommunications System
VCC Voice Call Circuit
VoIP Voice Over Internet Protocol
WiMAX Worldwide Interoperability for Microwave Access Further, various technical terms are used throughout this description. An illustrative resource that fleshes out various aspects of these terms can be found in Newton's Telecom Dictionary, 25th Edition (2009).

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Referring to the drawings in general, and initially to FIG. 1 in particular, a block diagram of an illustrative communications device according to one embodiment is provided and referenced generally by the numeral 100. Although some components are shown in the singular, they may be plural. For example, communications device 100 might include multiple processors or multiple radios, etc. As illustratively shown, communications device 100 includes a bus 110 that directly or indirectly couples various components together including memory 112, a processor 114, a presentation component 116, a radio 117 (if applicable), input/output ports 118, input/output components 120, and a power supply 122.

Memory 112 might take the form of memory components previously described. Thus, further elaboration will not be provided here, only to say that memory component 112 can include any type of medium that is capable of storing information (e.g., a database). A database can be any collection of records. In one embodiment, memory 112 includes a set of embodied computer-executable instructions 113 that, when executed, facilitate various aspects disclosed herein. These embodied instructions will variously be referred to as "instructions" or an "application" for short.

Processor 114 might actually be multiple processors that receive instructions and process them accordingly. Presentation component 116 includes the likes of a display, a speaker, as well as other components that can present information (such as a lamp (LED), or even lighted keyboards).

Numeral 117 represents a radio(s) that facilitates communication with a wireless-telecommunications network. Illustrative wireless telecommunications technologies include CDMA, GPRS, TDMA, GSM, and the like. Radio 117 might additionally or alternatively facilitate other types of wireless communications including Wi-Fi, WiMAX, LTE, or other VoIP communications. As can be appreciated, in various embodiments, radio 117 can be configured to support multiple technologies and/or multiple radios can be utilized to support multiple technologies.

Input/output port 118 might take on a variety of forms. Illustrative input/output ports include a USB jack, stereo jack, infrared port, proprietary communications ports, and the like. Input/output components 120 include items such as keyboards, microphones, speakers, touch screens, and any other item usable to directly or indirectly input data into communications device 100. Power supply 122 includes items such as batteries, fuel cells, or any other component that can act as a power source to power communications device 100.

As previously mentioned, embodiments of the present invention provide systems, methods, and computer-readable media for facilitating call continuity when transferring a voice call between a mobile access network (e.g., CDMA) and a VoIP network (e.g., Wi-Fi). Utilizing embodiments hereof, during a voice call, a user device can initiate transfer of the voice call from a mobile access network used to initially place the voice call to a newly accessed VoIP network. In this regard, in the event a VoIP network becomes accessible to a user device during a voice call, the voice call can be transferred to such a network thereby reducing resource utilization of the mobile access network.

Accordingly, in embodiments, a VoIP network can be efficiently accessed during a voice call without disrupting the voice call between a user and a recipient. That is, in accordance with embodiments described herein, transferring to a VoIP network from a mobile access network during a voice call can occur without using a VCC (voice call circuit) server to anchor every call in the event a user device is relocated such that the device can access a VoIP network.

By way of example only, assume that a user is on a voice call initiated via a mobile access network, such as CDMA. Further assume the user device enters an area in which VoIP services can be provided. In accordance with embodiments described herein, voice continuity can be maintained as the voice call is transferred from the mobile access network to the VoIP network. Rather than utilizing a VCC server for every voice call so that voice continuity can be maintained in the event that the user device is relocated to access a VoIP network, embodiments of the invention described herein utilize three-way calls to enable user devices to seamlessly switch networks mid-call when a VoIP network becomes accessible to the user devices.

Figure 2:
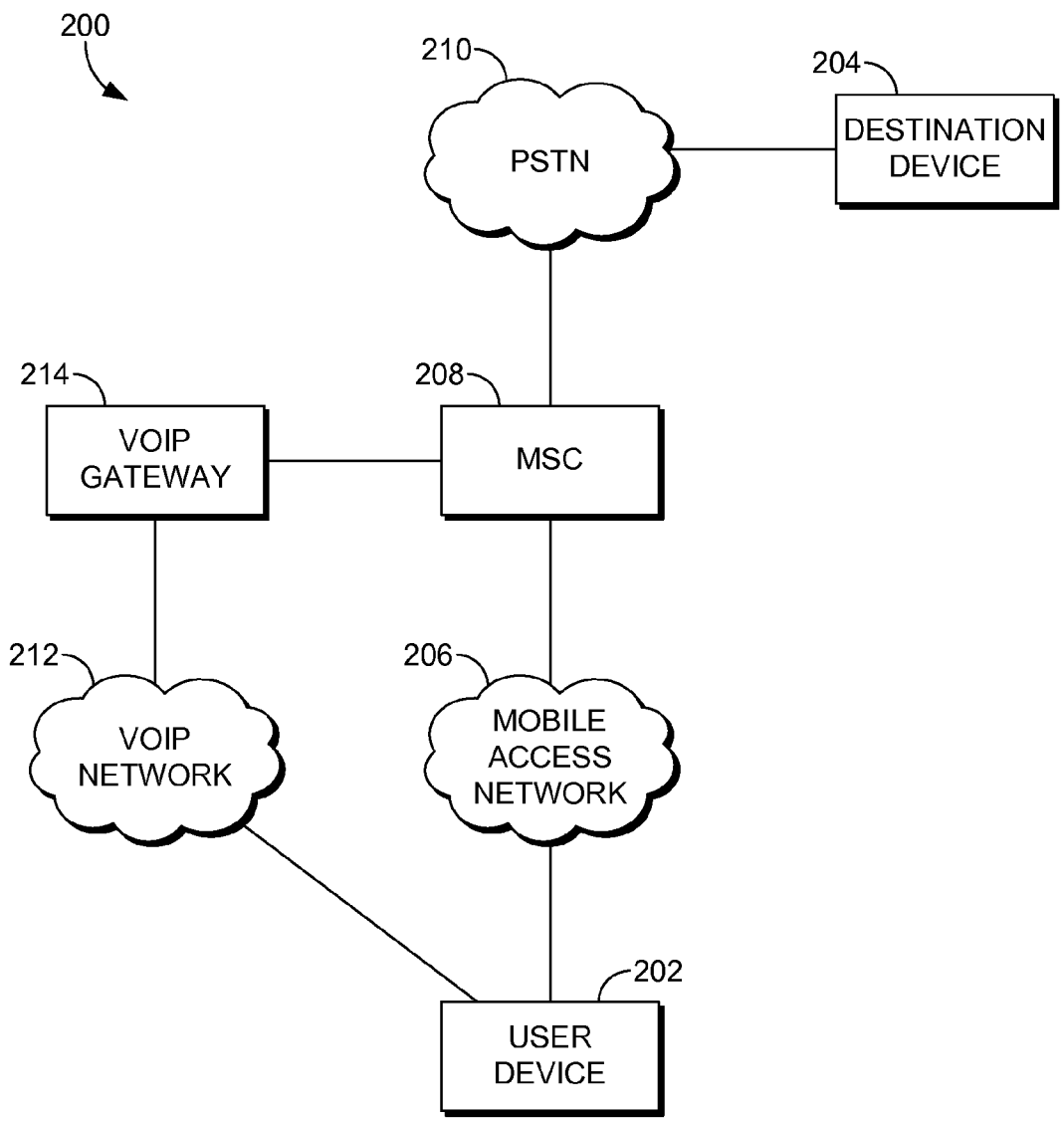
FIG. 2 is a schematic view of an exemplary network environment suitable for use in implementing embodiments of the present invention.

FIG. 2 provides an exemplary network environment suitable for use in implementing embodiments of the present invention. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

In the network environment 200, a user device 202 may communicate with other devices, such as destination device 204. The user device 202 may take on a variety of forms, such as a personal computer (PC), a laptop computer, a tablet, a netbook, a mobile phone, a Smart phone, a personal digital assistant (PDA), or any other device that is cable of communicating with other devices. For example, the user device 202 can take on any form, such as, for example, a mobile device or any other computing device capable of wirelessly communicating with the other devices using a mobile access network and a VoIP network for voice communications. Makers of illustrative devices include, for example, Research in Motion, Creative Technologies Corp., Samsung, Apple Computer, and the like. A device can include, for example, a display(s), a power source(s) (e.g., a battery), a data store(s), a speaker (s), memory, a buffer(s), and the like. In embodiments, a user device comprises a wireless or mobile device with which a mobile access network and a VoIP network can be utilized for communication (e.g., voice and/or data communication). In this regard, the user device can be any mobile computing device that communicates by way of, for example, a CDMA network and a Wi-Fi network.

The user device 202 initially communicates with other computing devices (e.g., a mobile device(s), a server(s), a personal computer(s), etc.) utilizing a network(s), such as the mobile access network 206. In embodiments, the mobile access network 206 (or cellular access network) is a telecommunications network(s), or a portion thereof. A telecommunications network might include an array of devices or components, some of which are not shown so as to not obscure more relevant aspects of the invention. Components such as terminals, links, and nodes (as well as other components) can provide connectivity in some embodiments. Mobile access network 206 can include multiple networks, as well as being a network of networks, but is shown in more simple form so as to not obscure other aspects of the present invention. The mobile access network 206 can be part of a telecommunication network that connects subscribers to their immediate service provider. In embodiments, the mobile access network 206 can be associated with a telecommunications provider that provides services to user devices, such as user device 202. For example, the mobile access network 206 may provide voice services to user devices or corresponding users that are registered or subscribed to utilize the services (e.g., the mobile access network 206) provided by a telecommunications provider. The mobile access network 206 can be any communication network providing voice service, such as, for example, a 1× circuit voice, a 3G network (e.g., CDMA, CDMA2000, WCDMA, GSM, UMTS), or a 4G network (WiMAX, LTE, HSDPA).

In initiating a voice call from the user device 202 to the destination device 204 via the mobile access network 206, the user device 202 communicates over established radio frequencies through a cell tower (not shown) having a base station, a number of which are typically connected to a base station controller (BSC). The user device 202 utilizes the public switched telephone network (PSTN) 210 to communicate with the destination device 204. In such a case, the user device 202 connects to a mobile switching center (MSC) 208 (e.g., via a base station controller). The MSC 208 acts as a telephone exchange to handle device activity through the associated one or more BSCs while connecting as needed through a telecommunication switch to the PSTN and/or other data network or component (e.g., VoIP gateway). As such, the MSC is responsible for, among other things, routing voice calls.

Upon setting up a voice call with the destination device 204 via the mobile access network 206, a user device 202 can be re-located or re-positioned to a geographical region in which the user device 202 can access a VoIP network to communicate or can otherwise be able to access a VoIP network. That is, a VoIP network that was not initially available when initiating the voice call between the user device 202 and the destination device 204 becomes available or accessible during the voice call. In embodiments, such a VoIP network may become available based on environmental conditions, movement into a geographical region associated with a VoIP network (e.g., user walks into network region, drives into network region, etc.), or the like. A VoIP (voice over Internet Protocol) network may be any packet-switched network, such as a Wi-Fi network, a WiMAX network, a LTE network, or the like.

The user device 202 is configured to detect accessibility to or availability of a VoIP network, such as VoIP network 212. Upon detecting access to the VoIP network 212, the user device 202 can acquire a data connection or data link with the VoIP network 212. Such a data connection with the VoIP network 212 can coexist with the data connection to the mobile access network 206. Accordingly, the data connection from the user device 202 to the VoIP network 212 can be established while continuing or maintaining the voice call with the destination device 204 via the mobile access network 206 and the PSTN 210.

Upon detecting the VoIP network 212 and establishing a connection therewith, the user device 202 can initiate a transfer to the VoIP network 212 or initiate a VoIP call (e.g., a VoIP Wi-Fi call) when the user device 202 is on an active voice call via the mobile access network 206. In some implementations, such a transfer can be initiated by, for example, initiating a three-way call. In one embodiment, to initiate a three-way call, the user device can perform a hook-switch flash, initiate a second voice call, and/or initiate binding of a first call and a second call. As can be appreciated, such an implementation can be performed automatically (i.e., without user intervention) upon the user device establishing a connection with a VoIP network and recognizing an ongoing active voice call using the mobile access network 206.

A "hook-switch flash" or "hook flash" refers to an action that can signal the telephone exchange to perform a function. Such an action can refer to a selection on a user device that simulates quickly hanging up then picking up again (e.g., an off-hook, on-hook, off-hook cycle). As used herein, a hook-switch flash is used to indicate a request for voice conferencing, for example, to initiate three-way calling. Accordingly, a hook-switch flash can be automatically performed by the user device 202 to initiate a three-way call thereby enabling the voice call to be transferred from the mobile access network 206 to the VoIP network 212. In this way, the initial voice call to the destination device 204 can be placed on hold in response to performance of the hook-switch flash.

In accordance with the hook-switch flash action, a second call can be automatically initiated. A second call can be initiated by the user device 202 communicating a conference indicator to the MSC 208. A conference indicator can include any code, identifier, or other indicator provided to the MSC 208 to initiate or establish a three-way call. For example, in one embodiment, a conference indicator may include any predetermined code, such as, for example, *c that indicates initiation of a second call. Alternatively or additionally, a conference indicator may include a user device identifier, such as a phone number, an IP address, a mobile device number, or the like. Such a user identifier associated with the user device 202 can be provided to facilitate establishing the three-way call with the requesting user device 202.

The user device 202 can then initiate a voice-call binding that binds the first call via the mobile access network 206 to the PSTN 210 and the second call via the mobile access network 206 to the VoIP gateway 214. In embodiments, a voice-call binding can be initiated by performing another hook-switch flash to bridge back to the initial call and bind at least a portion or segment of the calls together. In some cases, this second "flash" provides a signal to link the two active calls such that both calls are connected to the same logical telephone line.

As previously described, a conference indicator can be communicated to the MSC 208 to initiate or establish a three-way call. The MSC 208 receives the conference indicator and, upon reception of the conference indicator, the MSC 208 recognizes to relay an indication of a three-way call to the VoIP gateway 214. As such, the MSC 208 might provide the received conference indicator, or another conference indicator (e.g., a newly generated indicator or a modified indicator), to the VoIP gateway 214. In this regard, the MSC 208 can be configured to recognize the conference indicator and provide the conference indicator to the VoIP gateway 214 (rather than to the PSTN 210). Accordingly, a call is created from the user device 202 to the VoIP gateway 214 via the MSC 208. Upon such a connection, full voice is transmitted from the user device 202 to the destination device 204 via the MSC 208 and PSTN 210, and a silent path is transmitted to the VoIP gateway 214 via the MSC 208. That is, upon receiving the conference indicator, the MSC 208 holds the full voice path to the PSTN 210 and continues the second call (e.g., silent path) to the VoIP gateway 214. In such an implementation, a user may only perceive a minimal audio loss during bridge setup, which is a minimal amount of less than 100 milliseconds.

The VoIP gateway 214 receives and accepts the call and creates a new call through the VoIP network 212 to the user device 202. In this regard, the VoIP gateway 214 recognizes that it is being engaged as a three-way call and creates a VoIP call calling into the appropriate caller ID. By way of example, the VoIP gateway 214 can receive a notice that user device 202 associated with a unique device identifier (e.g., a phone number) is attempting to bridge a call. Such a notice can be provided via a conference indicator from the MSC 208. Upon reception of the notice, the VoIP gateway can look up the location of the user device 202 and make a VoIP call to the user device 202 corresponding with the user device identifier. The user device 202 having VoIP capabilities can then answer the VoIP call.

The VoIP gateway 214, as used herein, can refer to a media gateway or media gateway controller. Such a gateway can include an IP connection and codex to change from circuit-switch voice to packet-based voice and, conversely, to change from packet-based voice to circuit-switch voice. Accordingly, the VoIP gateway 214 can switch data from circuit switch to packet-based voice to place a VoIP call to the user device 202. Further, in embodiments, the VoIP gateway 214 can be enabled to perform SIP communications to user devices, such as a VoIP call to the user device 202.

In response to receiving a call from the VoIP gateway 214, the user device 202 can answer or accept the VoIP call to create a voice call via the VoIP network. Upon accepting the VoIP call from the VoIP gateway 214, a portion or segment of the initial or bound call from the user device 202 to the MSC 208 can be tore down. Such a circuit-call tear down can be initiated by the user device 202. For example, the user device 202 might initiate a tear down of the bound circuit call based on the received calling line identifier that identifies the user device. In embodiments, the user device 202 can be configured to recognize the incoming call from the VoIP gateway 214 and automatically accept the call, for example, when the user device 202 is currently communicating via the mobile access network and the incoming call is from the user device identifier associated with the user device 202 (or other predetermined identifier). Upon the circuit-call teardown, the audio bridge from the PSTN through the MSC 208 and the VoIP gateway 214 to the user device 202 is maintained for voice communication between the user device 202 and the destination device 204.

Figure 3:
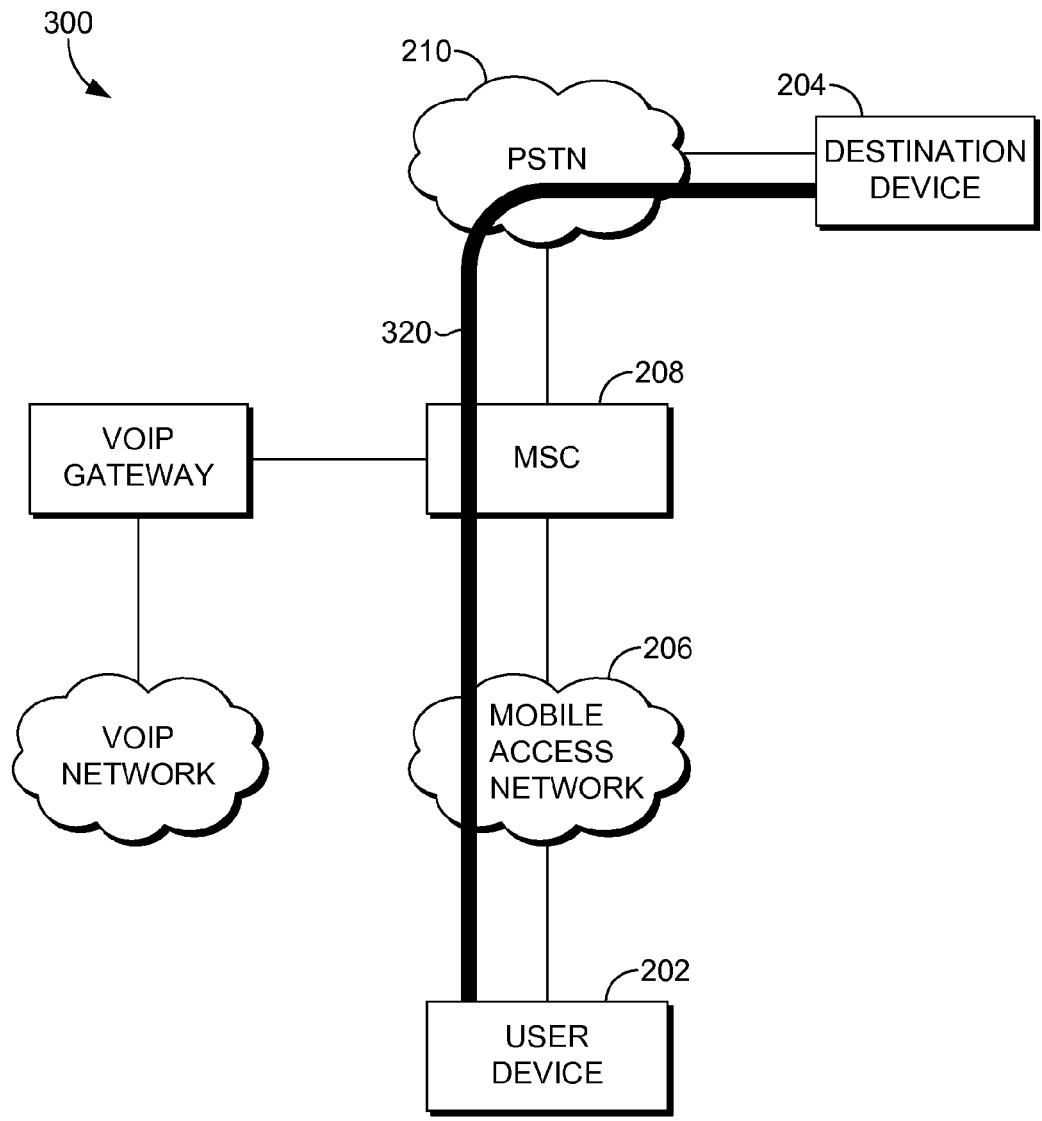
FIG. 3 is a schematic view of an exemplary network environment including a voice path established via a mobile access network, suitable for use in implementing embodiments of the present invention.
Figure 4:
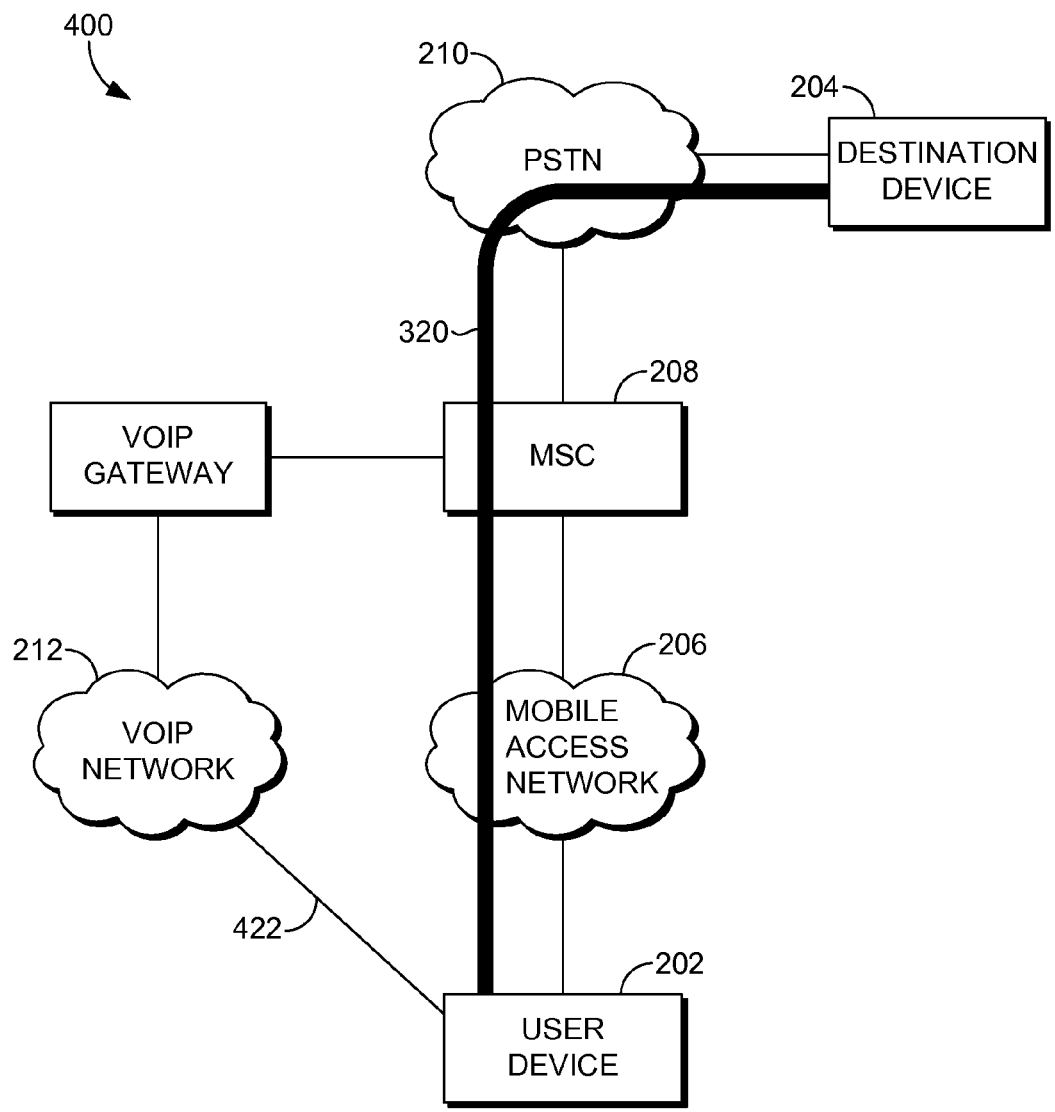
FIG. 4 is a schematic view of an exemplary network environment including a data connection established between a user device and a VoIP network, suitable for use in implementing embodiments of the present invention.
Figure 5:
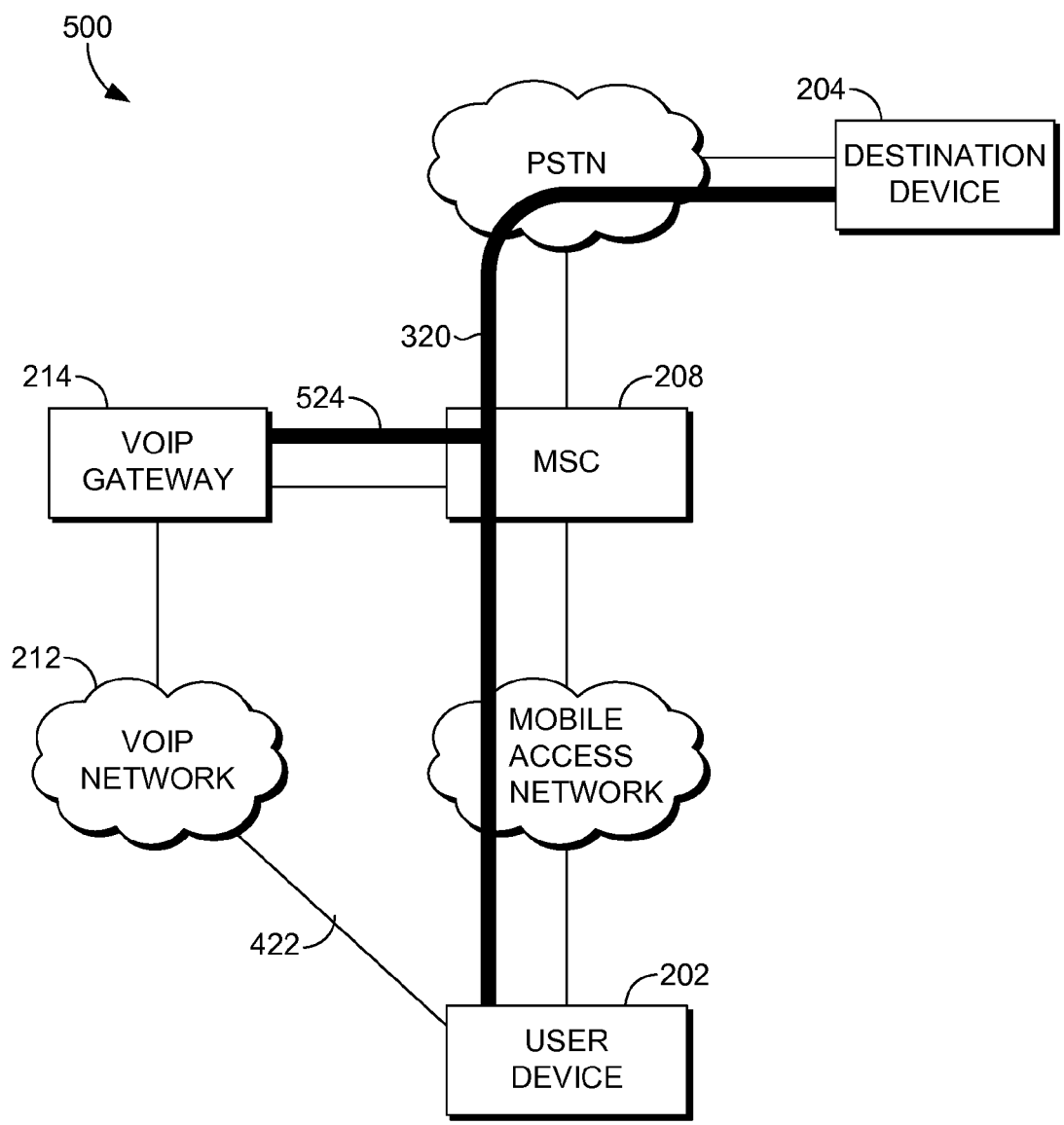
FIG. 5 is a schematic view of an exemplary network environment including another voice path established via a mobile access network to a VoIP gateway, suitable for use in implementing embodiments of the present invention.

With reference to FIGS. 3-7, FIGS. 3-7 illustrate an exemplary implementation for facilitating voice continuity as a voice call transfers from a mobile access network to a VoIP network. Initially, as illustrated in FIG. 3, a voice call path 320 is initially established from the user device 202 to the destination device 204 via the mobile access network 206, the MSC 208, and the PSTN 210. Now assume, and with reference to FIG. 4, that the VoIP network 212 becomes available or accessible to the user device 202. Accordingly, as illustrated in FIG. 4, a data connection 422 is established between the user device 202 and the VoIP network 212. As can be appreciated, the voice call path 320 is maintained from the user device 202 to the destination device 204 via the mobile access network 206, the MSC 208, and the PSTN 210.

Upon establishing the data connection 422 between the user device 202 and the VoIP network 212, the user device can perform a hook-switch flash to place the voice call path 320 on hold, communicate a conference indicator to the MSC 208 to indicate a request for a three-way call, and initiate a call binding (e.g., perform a second hook-switch flash). As illustrated in FIG. 500, the full voice path 320 between the user device 202 and the destination device 204 is maintained and bound or connected with a silent voice path 524 that is established between the user device 202 and the VoIP gateway 214 via the MSC 208.

Figure 6:
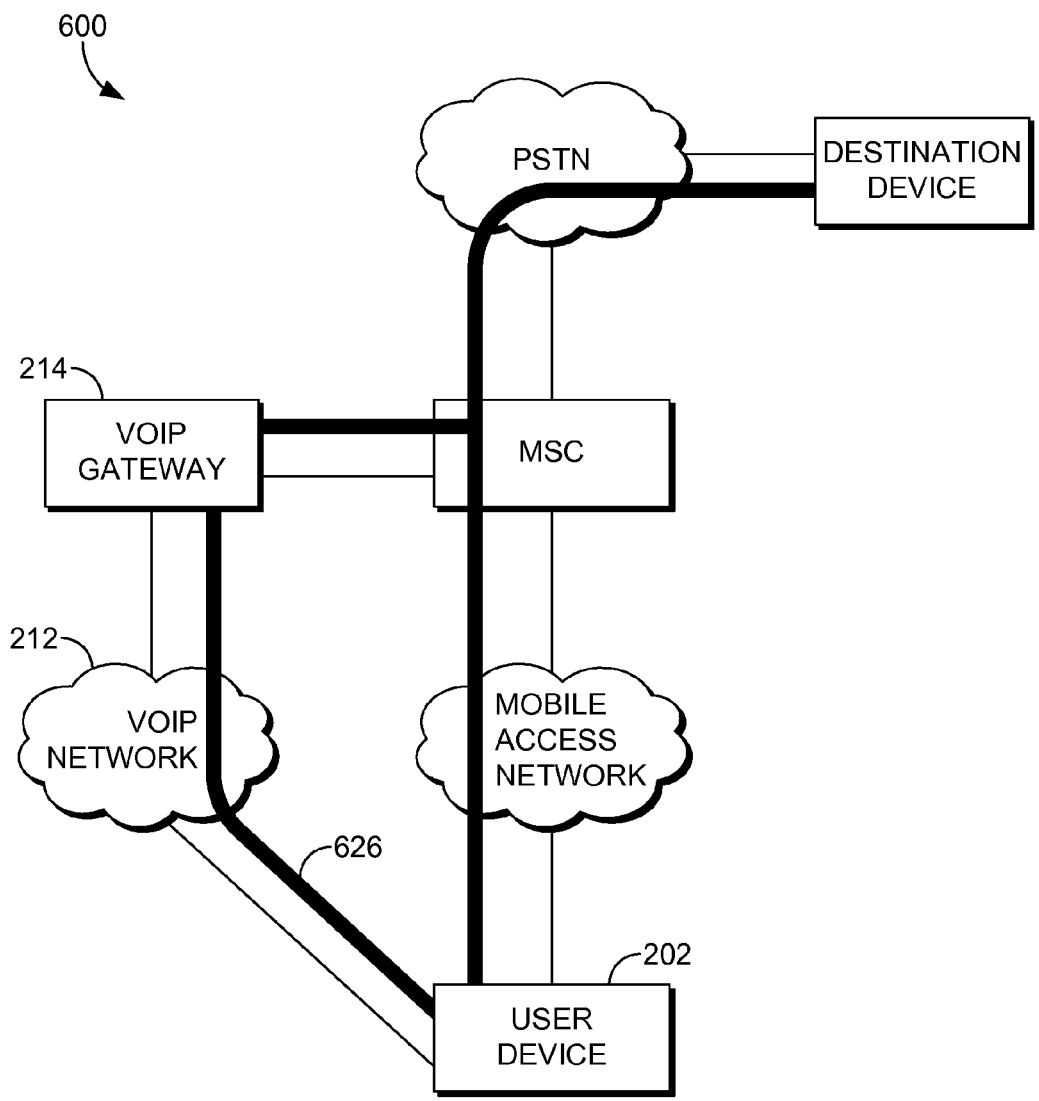
FIG. 6 is a schematic view of an exemplary network environment including a voice path established between a VoIP gateway and a user device via a VoIP network, suitable for use in implementing embodiments of the present invention.
Figure 7:
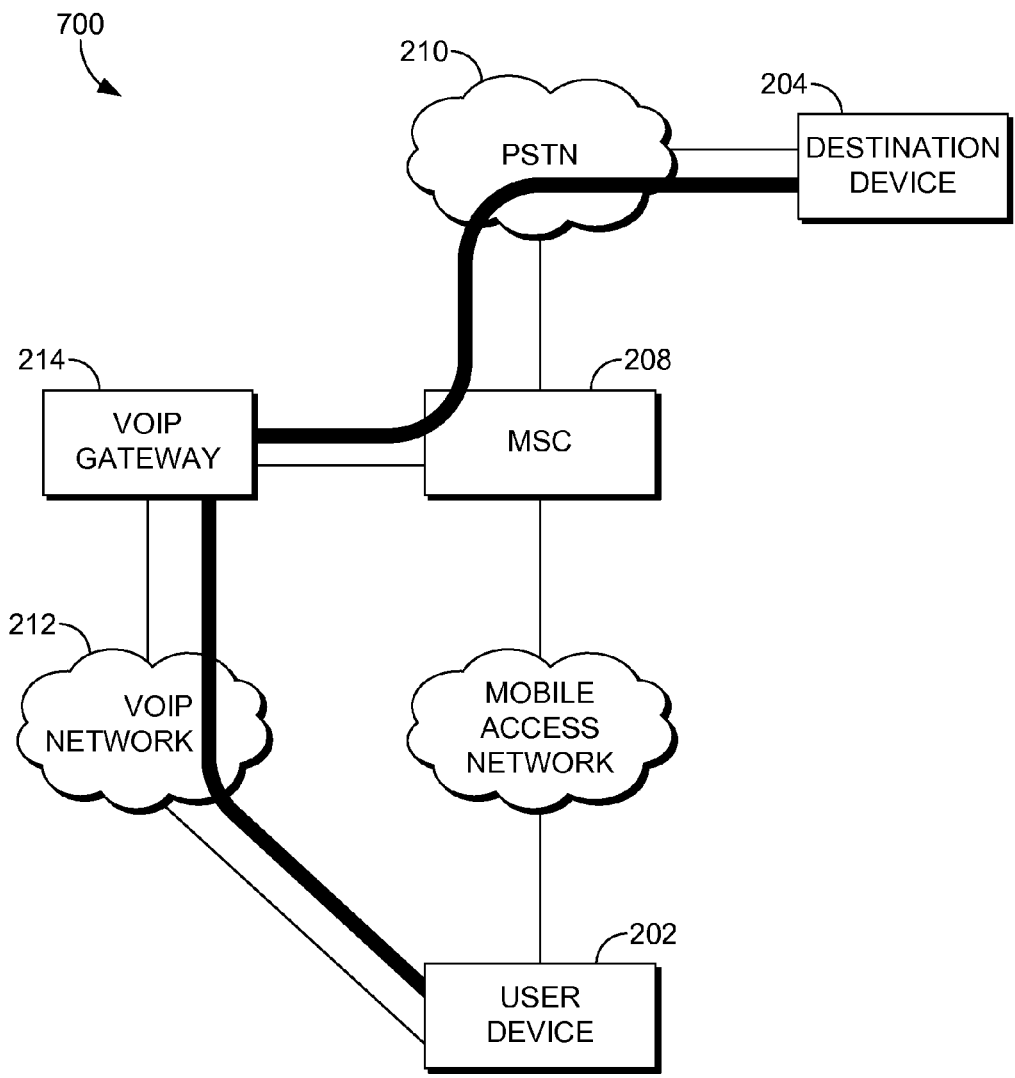
FIG. 7 is a schematic view of an exemplary network environment including a voice path used for communication between a user device and a destination device via a VoIP network, suitable for use in implementing embodiments of the present invention.

FIG. 6 illustrates a voice path 626 being established between the VoIP Gateway 214 and the user device 202 via the VoIP network 212. Such a voice path 626 can be initiated, for instance, upon the VoIP gateway receiving an indication (e.g., a conference indicator) to initiate a VoIP call to the user device. Such an indication may include a user identifier associated with the user device so that the VoIP can complete the VoIP call. Upon establishing the voice path 626 using the VoIP network 212, the user device triggers a circuit-call teardown between the user device 202 and the MSC 206. This is illustrated in FIG. 7. Upon tear down, the initial voice call via the wireless access network has, in essence, transferred to the VoIP network. Accordingly, the user device 202 communicates with the destination device 204 via the VoIP network 212, the VoIP gateway 214, the MSC 208, and the PSTN 210, as shown in FIG. 7.

Figure 8:
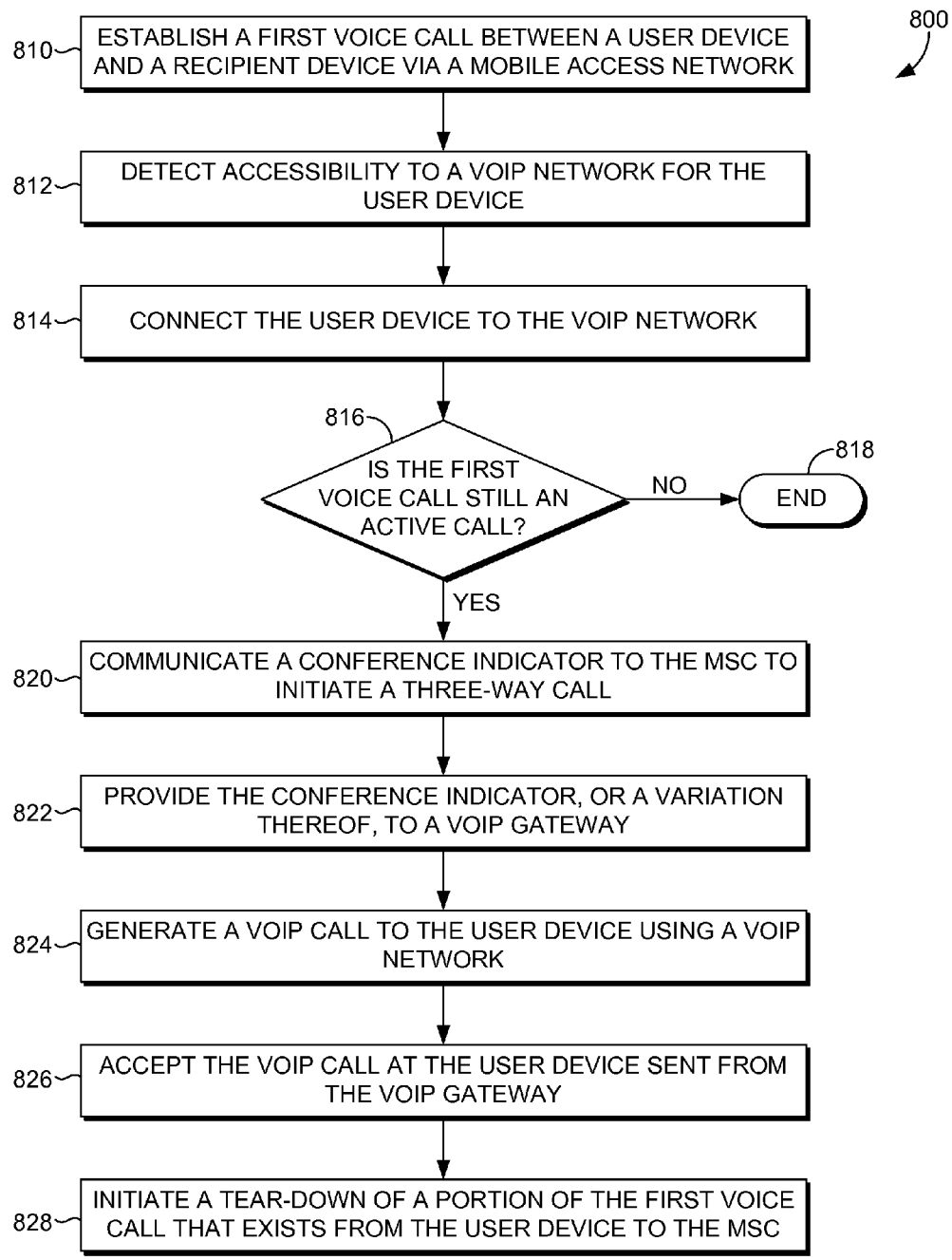
FIG. 8 provides a first exemplary method for facilitating call continuity when transferring calls between a mobile access network to a VoIP network, in accordance with an embodiment of the present invention.

Turning now to FIG. 8, a flow diagram is shown illustrating an exemplary method 800 for facilitating call continuity when transferring calls between a mobile access network to a VoIP network, in accordance with an embodiment of the present invention. In embodiments, method 800 can be performed using various devices of a network environment, such as those illustrated in FIG. 2.

Initially, at block 810, a first voice call is established between a user device and a recipient device using a mobile access network, such as CDMA. Subsequently, at block 812, accessibility to a VoIP network for the device is detected. For example, when a user device becomes within range of a Wi-Fi network, such a network is detected. At block 814, the user device connects to the VoIP network.

Thereafter, at block 816, it is determined whether the first voice call between the user device and the recipient device remains an active call. If not, the method ends at block 818. If, however, the first voice call is active when the VoIP network is accessible to the user device, the user device communicates a conference indicator to the MSC to initiate a three-way call, as indicated at block 820. As can be appreciated, the conference indicator may include a user device identifier to identify the user device.

Upon receiving the conference indicator, at block 822, the MSC provides the conference indicator, or other similar indicator, to a VoIP gateway. In response to reception of the conference indicator received by the VoIP gateway, at block 824, the VoIP gateway generates a VoIP call to the user device utilizing a VoIP network. In embodiments, the VoIP gateway may place the VoIP call in accordance with the user device identifier associated with the user device. Subsequently, at block 826, the user device automatically accepts the VoIP call from the VoIP gateway. In some cases, prior to accepting the call, the user device recognizes an associated identifier (e.g., user device identifier or other code) so that it recognizes that a voice transfer is being attempted. Upon establishing the VoIP call with the VoIP gateway, the user device initiates a tear down of a portion of the first voice call from the user device to the MSC, as indicated at block 828.

Figure 9:
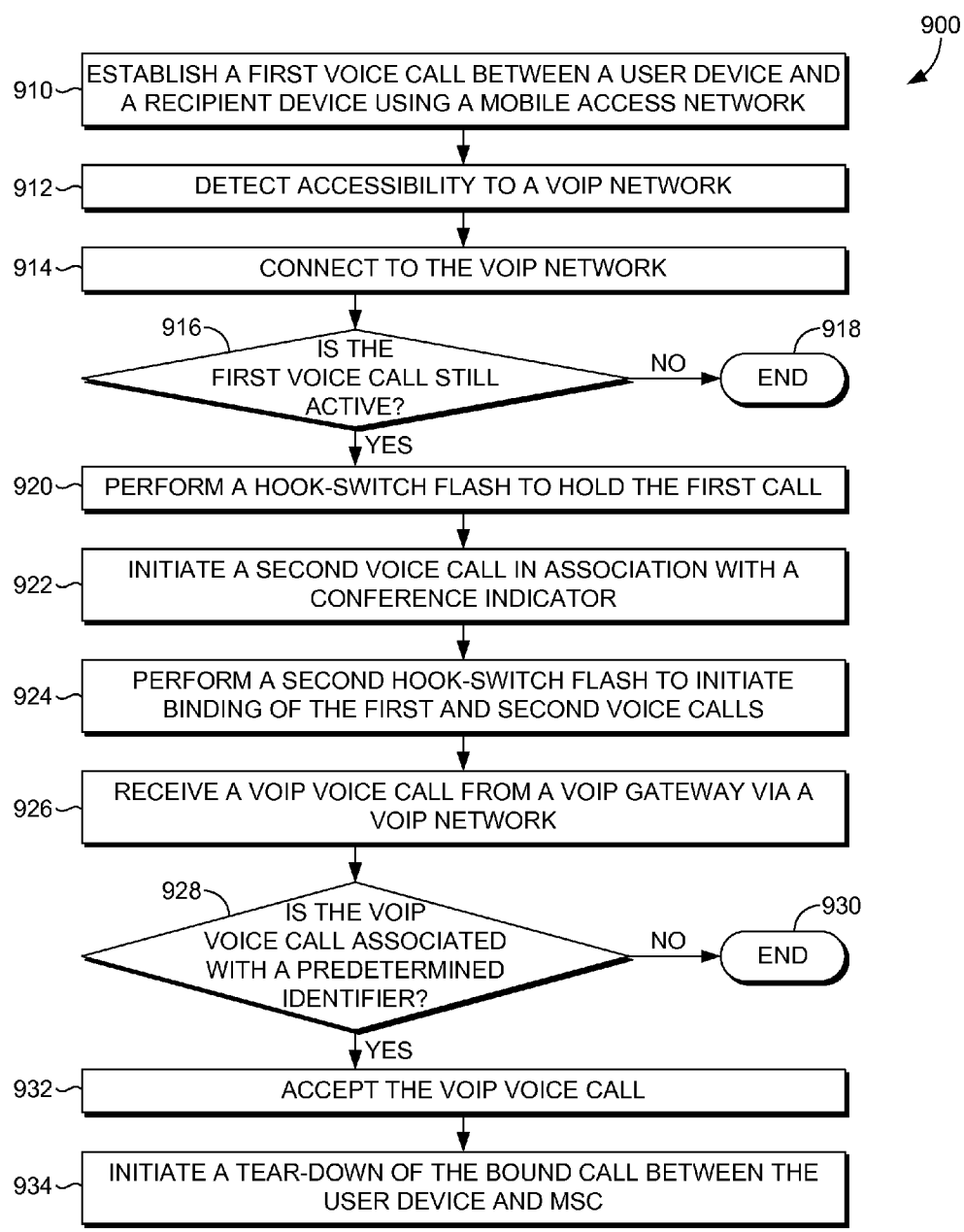
FIG. 9 provides a second exemplary method for facilitating call continuity when transferring calls between a mobile access network to a VoIP network, in accordance with an embodiment of the present invention.

Turning now to FIG. 9, a flow diagram is shown illustrating another exemplary method 900 for facilitating call continuity when transferring calls between a mobile access network to a VoIP network, in accordance with an embodiment of the present invention. In embodiments, method 900 can be performed via a user device, such as user device 202 illustrated in FIG. 2.

Initially, at block 910, a first voice call is established between a user device and a recipient device using a mobile access network, such as CDMA. Subsequently, at block 912, accessibility to a VoIP network is detected. For example, when a user device becomes within range of a Wi-Fi network, such a network is detected. At block 914, the user device connects to the VoIP network.

Thereafter, at block 916, it is determined whether the first voice call between the user device and the recipient device remains an active call. If not, the method ends at block 918. If, however, the first voice call is active when the VoIP network is accessible to the user device, the user device performs a hook-switch flash to hold the first voice call, as indicated at block 920. At block 922, the user device initiates a second voice call in association with a conference indicator. Such a conference indicator provides an indication to the MSC to communicate with the VoIP gateway (rather than the PSTN). At block 924, a second hook-switch flash is performed to bridge back to the first voice call and initiate binding the first and second voice calls.

At block 926, a VoIP voice call is received from a VoIP gateway via a VoIP network. Subsequently, at block 928, it is determined if the VoIP voice call is associated with a predetermined identifier. For example, the predetermined identifier may be the unique user device identifier associated with the user device transferring from the mobile access network to the VoIP network or another code or identifier that indicates an attempt to transfer a voice call to an available VoIP network. If not, the method ends at block 930. If so, the VoIP voice call is automatically accepted, as indicated at block 932, to establish a connection with the recipient via a VoIP network. At block 934, a tear down of the bound voice call from the user device to the MSC is initiated.

Figure 10:
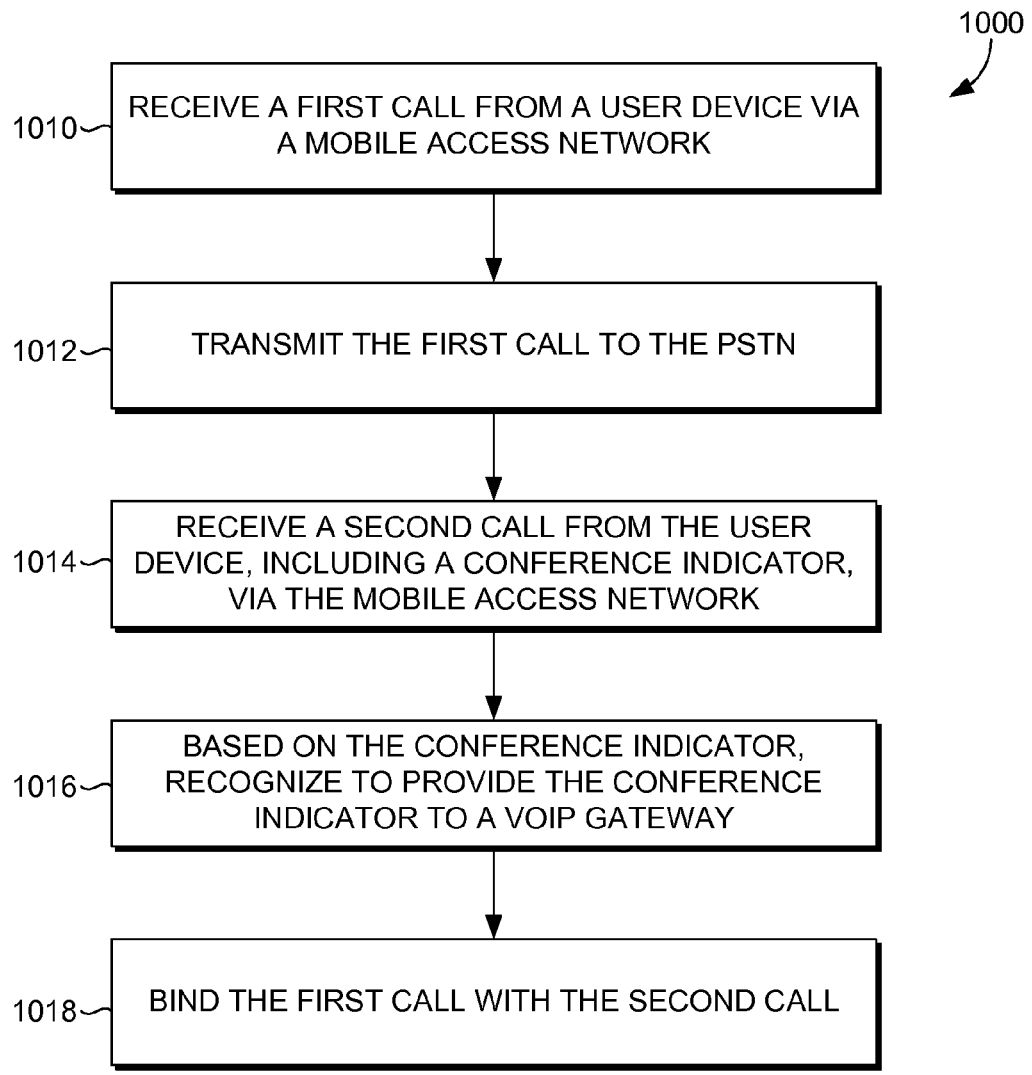
FIG. 10 provides a third exemplary method for facilitating call continuity when transferring calls between a mobile access network to a VoIP network, in accordance with an embodiment of the present invention.

Turning now to FIG. 10, a flow diagram is shown illustrating another exemplary method 1000 for facilitating call continuity when transferring calls between a mobile access network to a VoIP network, in accordance with an embodiment of the present invention. In embodiments, method 1000 can be performed via a MSC, such as MSC 208 illustrated in FIG. 2.

Initially, at block 1010, a first call is received from a user device via a mobile access network. At block 1012, the first call is transmitted to the PSTN. At block 1014, a second call along with a conference indicator is received from a user device via a mobile access network, such as CDMA. In embodiments, the first call can be placed on hold (e.g., via reception of a hook-switch flash indication provided by the user device) prior to or in accordance with receiving the second call and/or conference indicator. Based on the conference indicator, at block 1016, it is recognized to provide the conference indicator, or an alternative form thereof, to a VoIP gateway. In this way, the second call can continue from the MSC to the VoIP gateway. At block 1018, the first call is bound or integrated with the second call. Such a binding may occur, for example, upon receiving a hook-switch flash indication from the user device.

It will be understood by those of ordinary skill in the art that the order of steps shown in the method 800 of FIG. 8, method 900 of FIG. 9, and method 1000 of FIG. 10 is not meant to limit the scope of the present invention in any way and, in fact, the steps may occur in a variety of different sequences within embodiments hereof. Any and all such variations, and any combination thereof, are contemplated to be within the scope of embodiments of the present invention.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more non-transitory computer-readable storage media having computer-executable instructions embodied thereon that, when executed, perform a method for facilitating call continuity when transferring calls between mobile access networks to voice over internet protocol networks, the method comprising:
during a voice call established via a wireless access network, recognizing availability of a voice over internet protocol network, wherein the voice over internet protocol network was not accessible when the voice call was established via the wireless access network;
establishing a data connection between a user device and the voice over internet protocol network; and
initiating a transfer of the voice call from the wireless access network to the voice over internet protocol network by initiating a three-way call, wherein the three-way call comprises a first portion routed to a destination device via a public switch telephone network and a second portion routed to the user device via the voice over internet protocol network.

2. The media of claim 1, wherein the voice over internet protocol network is recognized after the voice call is established between the user device and the destination device using the wireless access network.

3. The media of claim 1, wherein the three-way call is initiated by automatically performing a hook-switch flash to hold the first portion, initiating the second portion by communicating a conference indicator to a mobile switching center that indicates initiation of the three-way call, and performing a second hook-switch flash to initiate binding a first segment of the first portion and a first segment of the second portion, the first segment of the first portion and the first segment of the second portion being between the user device and the mobile switching center.

4. The media of claim 3, wherein the second portion of the three-way call is routed to the user device via a voice over internet protocol gateway.

5. The media of claim 4 further comprising receiving the second portion of the three-way call at the user device and initiating a tear down of the bound first segment of the first portion and the first segment of the second portion.

6. One or more non-transitory computer-readable storage media having computer-executable instructions embodied thereon that, when executed, perform a method for facilitating call continuity when transferring calls between mobile access networks to voice over internet protocol networks, the method comprising:
during a first voice call established between a user device and a destination device via a wireless access network, establishing a data connection between the user device and a voice over internet protocol network, wherein the voice over internet protocol network was not accessible when the first voice call was established via the wireless access network;
automatically performing an action via the user device to initiate placing the first voice call on hold;
initiating a second voice call by communicating a conference indicator that provides an indication to initiate a three-way call using the voice over internet protocol network;
initiating a binding of a first portion of the first voice call and a first portion of the second voice call;
receiving a voice over internet protocol call via the voice over internet protocol network;
initiating a tear down of the bound first portion of the first voice call and first portion of the second voice call that exists from the user device to a mobile switching center; and
communicating with the destination device via the voice over internet protocol network.

7. The media of claim 6, wherein the communications with the destination device via the voice over internet protocol network are transmitted through the voice over internet protocol gateway, the mobile switching center, and a public switching telephone network.

8. The media of claim 6, wherein the action comprises a hook-switch flash automatically performed by the user device in response to the data connection established between the user device and the voice over internet protocol network.

9. The media of claim 6, wherein the conference indicator includes a user device identifier to uniquely identify the user device.

10. The media of claim 6, wherein the conference indicator is communicated to the mobile switching center.

11. The media of claim 6, wherein the binding of the first portion of the first voice call and the first portion of the second voice call is initiated via a hook-switch flash automatic performed by the user device.

12. The media of claim 6, wherein the voice over internet protocol call is initiated by a voice over internet protocol gateway.

13. The media of claim 12, wherein the voice over internet protocol gateway initiated the voice over internet protocol call based on an indication received by the mobile switching center to place a call to the user device.

14. The media of claim 6, wherein the tear down is initiated upon recognizing that the voice over internet protocol call is associated with a three-way call attempting to utilize the voice over internet protocol network for communication between the user device and the destination device.

* * * * *